United States Patent [19]
Liaom

[11] Patent Number: 6,048,211
[45] Date of Patent: Apr. 11, 2000

[54] REVERSIBLE CABLE REEL

[76] Inventor: Sheng-Hsin Liaom, No. 10, Alley 38, Lane 229, San Chun St., Shu Lin Town, Taipei Hsien, Taiwan

[21] Appl. No.: 09/028,923

[22] Filed: Feb. 24, 1998

[30] Foreign Application Priority Data

Dec. 26, 1997 [TW] Taiwan ................................. 86221455

[51] Int. Cl.[7] .................................................. H01R 39/00
[52] U.S. Cl. ................................................ 439/4; 439/22
[58] Field of Search .................... 439/4, 21, 22, 439/27, 501; 242/378.4; 191/12.2 R, 12.2 A

[56] References Cited

U.S. PATENT DOCUMENTS

| | | | |
|---|---|---|---|
| 5,180,040 | 1/1993 | Ji | 191/12.2 R |
| 5,422,957 | 6/1995 | Cummins | 439/501 |
| 5,641,067 | 6/1997 | Ellis | 439/4 |
| 5,669,571 | 9/1997 | Graybill | 242/378.4 |
| 5,690,498 | 11/1997 | Sobhani | 439/22 |
| 5,704,792 | 1/1998 | Sobhani | 439/21 |

Primary Examiner—Paula Bradley
Assistant Examiner—Katrina Davis
Attorney, Agent, or Firm—Rosenberg, Klein & Lee

[57] ABSTRACT

A reversible cable reel which includes two cover shells having a respective center shaft axially connected to each other, two cable wheels respectively mounted around the center shafts inside the cover shells, two spiral springs respectively mounted around the center shafts inside the cover shells, each spiral spring having an inner end connected to the respective cover shell and an outer end connected to the respective cable wheel, two cables respectively wound round the cable wheels, each cable having a fixed end fastened to the respective cable wheel and a free end extended out of the respective cover shell and mounted with a module plug, a first terminal unit mounted in one cable wheel and connected to conductors in one cable, a second terminal unit mounted in the other cable wheel and connected to conductors in the other cable and separated from the first terminal unit by a cover plate, the second terminal unit having contact means projecting into respective through holes on the cover plate into contact with the first terminal unit.

6 Claims, 16 Drawing Sheets

REVERSIBLE CABLE REEL

BACKGROUND OF THE INVENTION

The present invention relates to a reversible cable reel, and more particularly to such a reversible cable reel which comprises two cable wheels reversibly controlled by spiral springs inside a housing to hold a respective cable, and two terminal units respectively mounted in the cable wheels and disposed in contact with each other.

Regular cable reels are commonly comprised of a rack, and a reel revolvably supported on the rack to take up a cable. When taking up the cable, the reel must be rotated with the hand through a handle at one side of the reel. Therefore, much effort must be employed to the handle when taking up the cable. Further, regular cable reels are commonly heavy, and the workable distance is limited.

SUMMARY OF THE INVENTION

The present invention provides a reversible cable reel which eliminates the aforesaid drawbacks. It is one object of the present invention to provide a cable reel which can automatically take up the cable. It is another object of the present invention to provide a cable reel which is inexpensive to manufacture and easy to assemble. It is still another object of the present invention to provide a cable reel which permits a plurality of cable reels of the same structure to be connected in a stack. According to one aspect of the present invention, the reversible cable reel comprises two cover shells having a respective center shaft axially connected to each other, two cable wheels respectively mounted around the center shafts inside the cover shells, two spiral springs respectively mounted around the center shafts inside the cover shells, each spiral spring having an inner end connected to the respective cover shell and an outer end connected to the respective cable wheel, two cables respectively wound round the cable wheels, each cable having a fixed end fastened to the respective cable wheel and a free end extended out of the respective cover shell and mounted with a module plug, a first terminal unit mounted in one cable wheel and connected to conductors in one cable, a second terminal unit mounted in the other cable wheel and connected to conductors in the other cable and separated from the first terminal unit by a cover plate, the second terminal unit having contact means projecting into respective through holes on the cover plate into contact with the first terminal unit. According to another aspect of the present invention, one cover shell has a male coupling means on the outside and the other cover shell has a female coupling means on the outside, such that a plurality of reversible cable reels can be connected in a stack by fastening the male coupling means on one reversible cable reel to the female coupling means on another.

DETAILED DESCRIPTION OF THE PREFERRED EMBODIMENT

Figure 1:
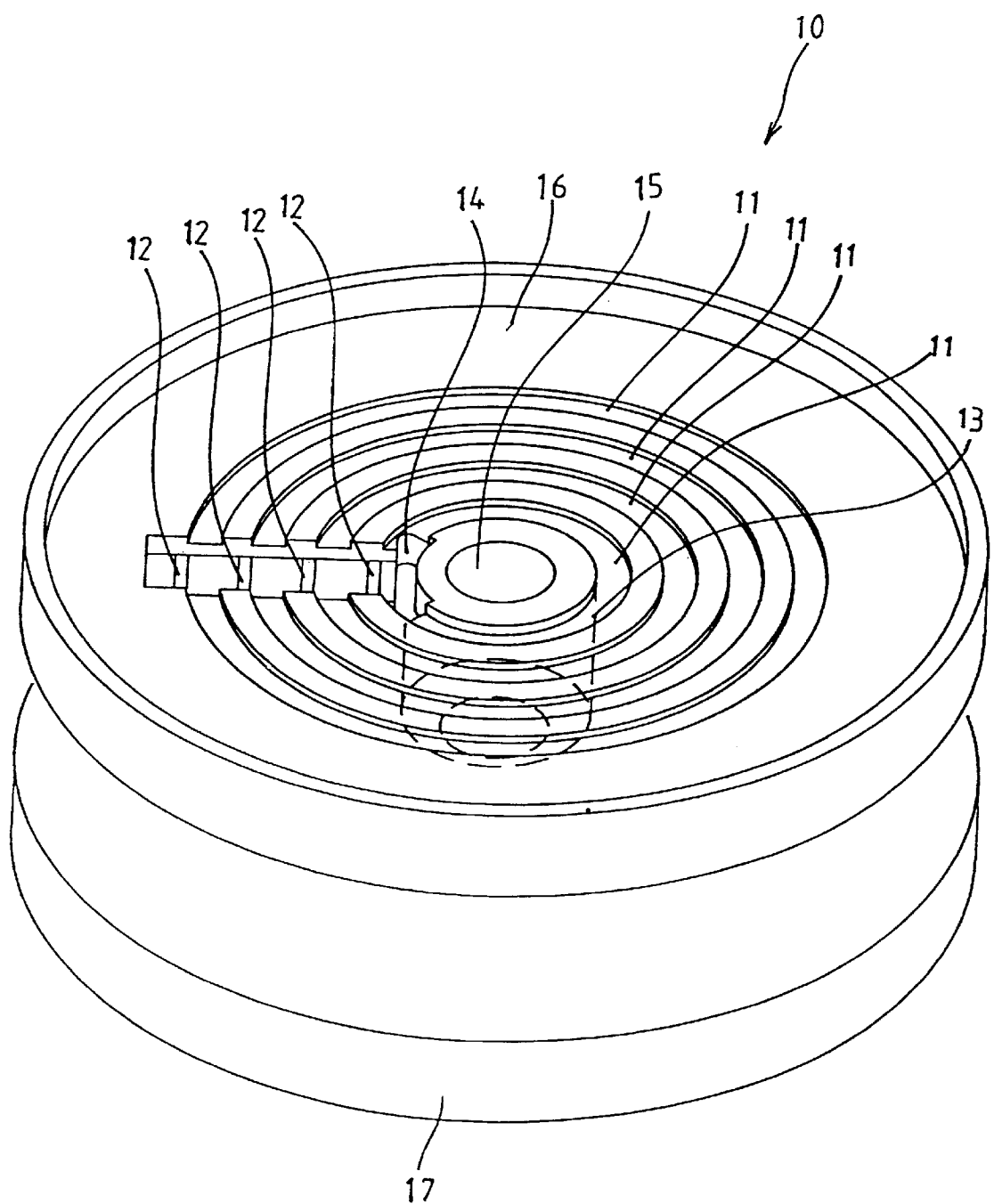
FIG. 1 is a perspective view of a cable wheel according to the present invention.

Referring to FIGS. from 9A to 9E, a reversible cable reel in accordance with a first embodiment of the present invention is generally comprised of two cover shells 60, two cable wheels 10, a first terminal unit 20, a second terminal unit 40, a cover plate 30, two spiral springs 50, and two cables 90.

Figure 6A:
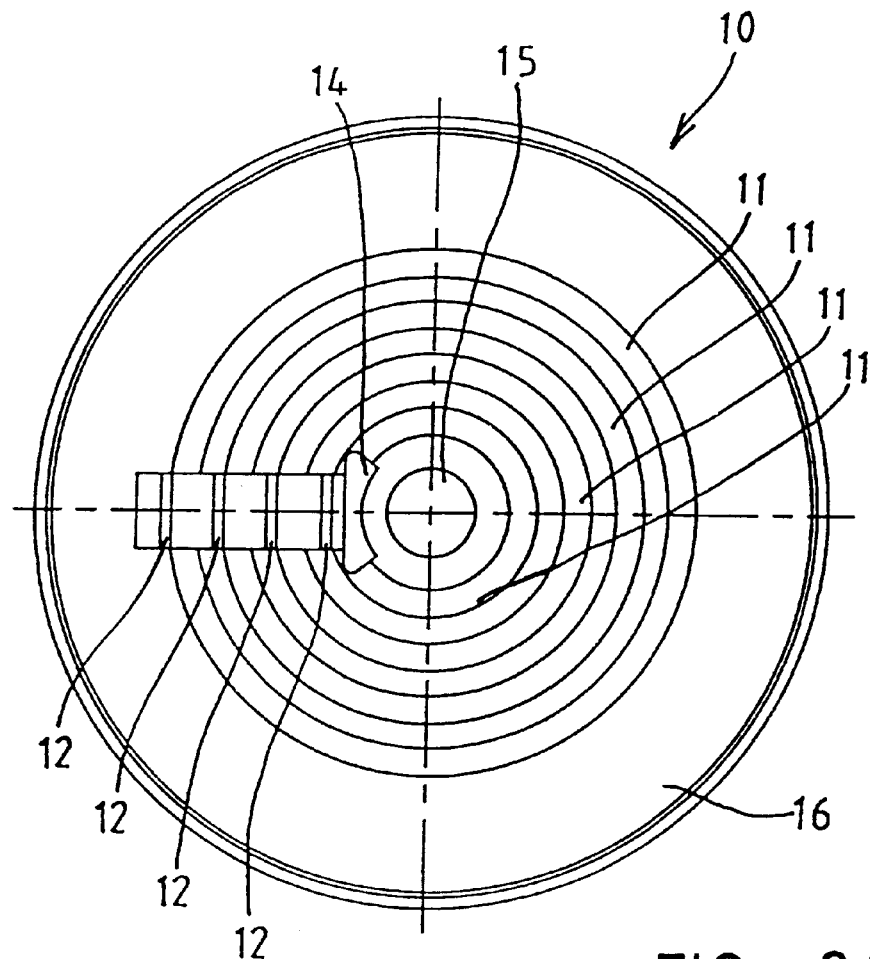
FIG. 6A is a top view of the cable wheel according to the first embodiment of the present invention.
Figure 6B:
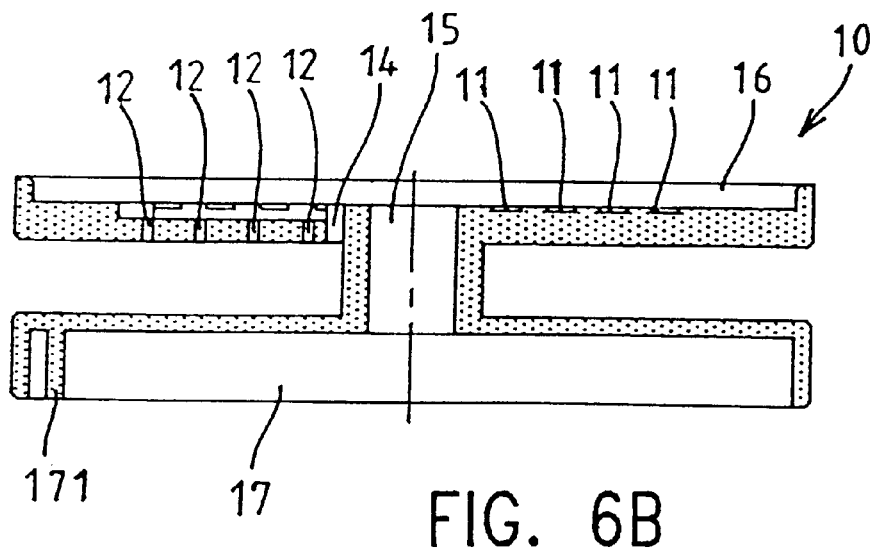
FIG. 6B is a front view of the cable wheel according to the first embodiment of the present invention.
Figure 7A:
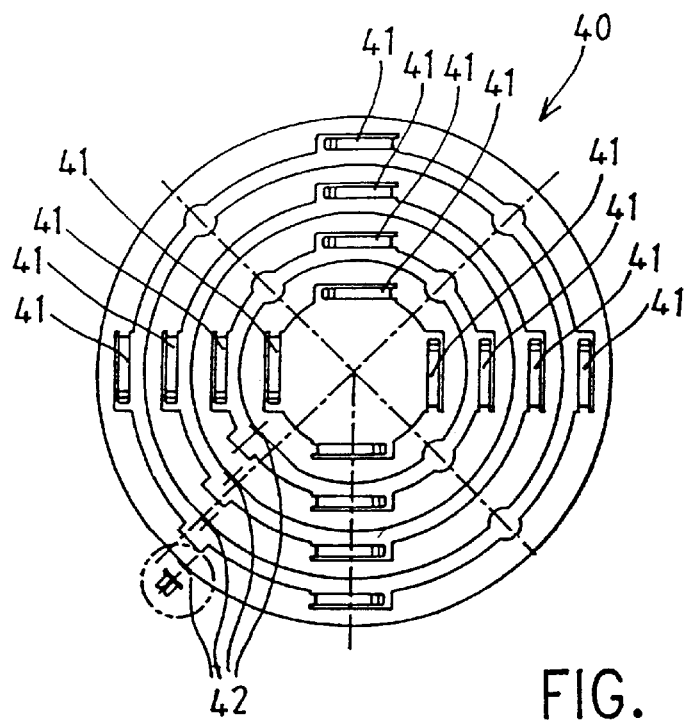
FIG. 7A is a top view of the second terminal unit according to the first embodiment of the present invention.
Figure 7B:
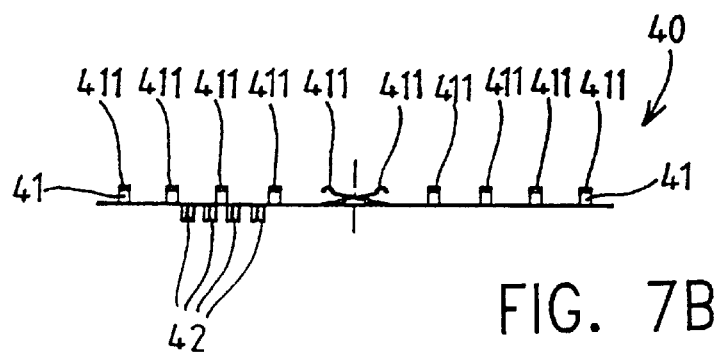
FIG. 7B is a front view of the second terminal unit according to the first embodiment of the present invention.
Figure 7C:
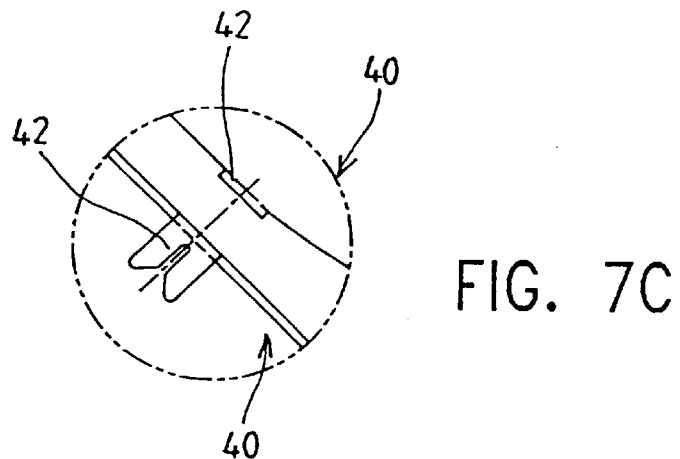
FIG. 7C is an enlarged view of a part of the second terminal unit according to the first embodiment of the present invention.

Referring to FIGS. 1, 6A and 6B, the cable wheel 10, comprises a recessed top chamber 16, a recessed bottom chamber 17, a center shaft 13 connected between the recessed top chamber 16 and the recessed bottom chamber 17, a center axle hole 15 through the longitudinal central axis of the center shaft 13, a plurality of annular grooves 11 concentrically arranged one within another inside the recessed top chamber 16 around the center axle hole 15, a plurality of through holes 12 respectively piercing through the annular grooves 11, a cable outlet 14, and a locating plate 171 inside the recessed bottom chamber 17 (see FIG. 6B).

Figure 2:
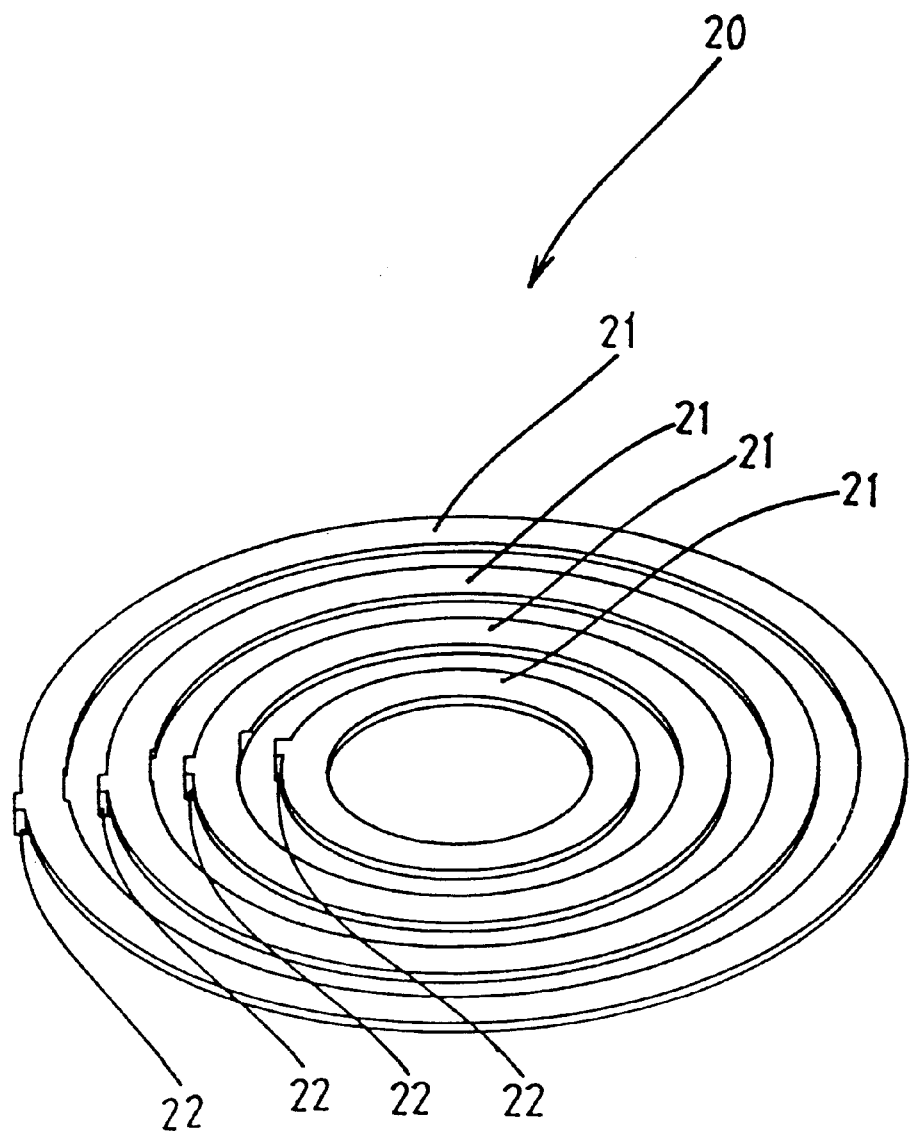
FIG. 2 is a perspective view of a first terminal unit according to the present invention.

Referring to FIG. 2, the first terminal unit 20 comprises a plurality of metal rings 21 of different sizes respectively mounted in the annular grooves 11 on one cable wheel 10. Each metal ring 21 has a forked contact tip 22 designed to be inserted through one through hole 12 on one cable wheel 10 and then forced into contact with one conductor in one cable 90 (see also FIGS. from 9A to 9E).

Figure 3:
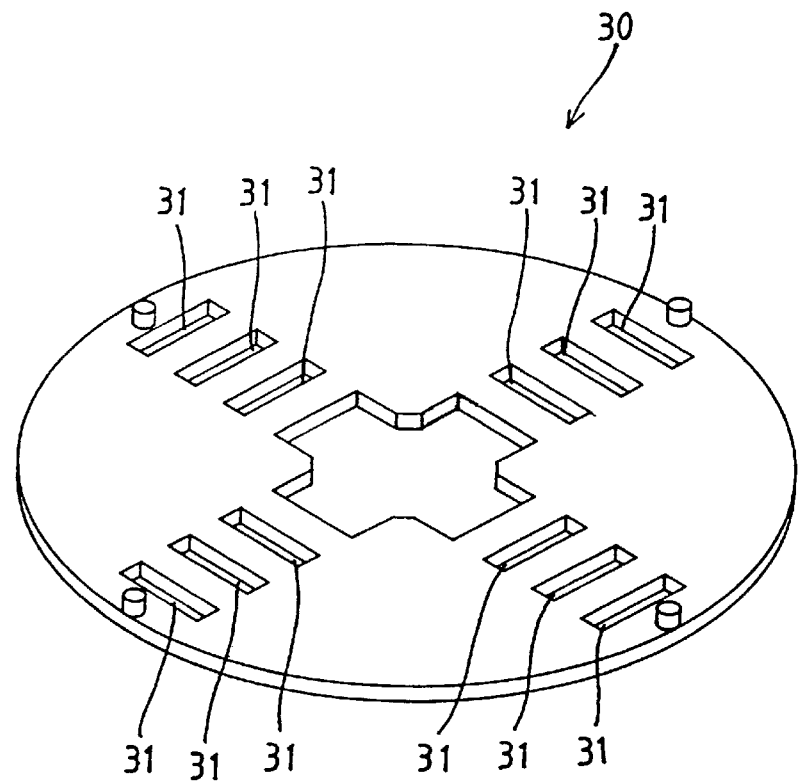
FIG. 3 is a perspective view of the cover plate for the reversible cable reel according to the first embodiment of the present invention.
Figure 4:
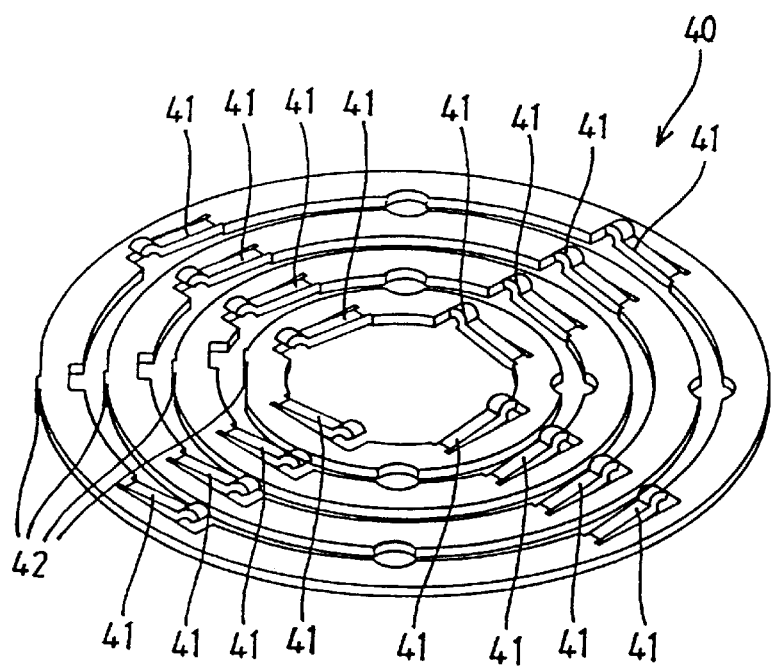
FIG. 4 is a perspective view of the second terminal unit for the reversible cable reel according to the first embodiment of the present invention.

Referring to FIG. 3, the cover plate 30 is retained between the first terminal unit 20 and the second terminal unit 40, having a plurality of through holes 31.

Referring to FIGS. 4, 7A, 7B, 7C and FIGS. from 9A to 9E, the second terminal unit 40 comprises a plurality of metal rings of different sizes respectively mounted in the annular grooves 11 on one cable wheel 10. Each metal rings of the second terminal unit 40 have a plurality of forked contact tips 42 designed to be inserted through the through holes 12 on one cable wheel 10 and then forced into contact with respective conductors in one cable 90, and a plurality of contact spring strips 41 respectively inserted the through holes 31 on the cover plate 30 into contact with the metal rings 21 of the first terminal unit 20. Each contact spring strip 41 has at least one contact portion 411 for contact with the first terminal unit 20.

Figure 5A:
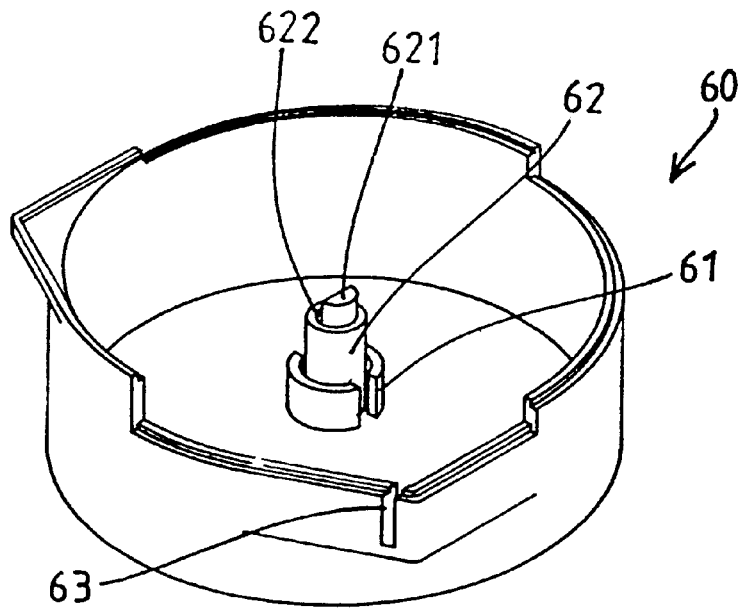
FIGS. 5A and 5B show the cover shells for the reversible cable reel according to the first embodiment of the present invention.
Figure 5B:
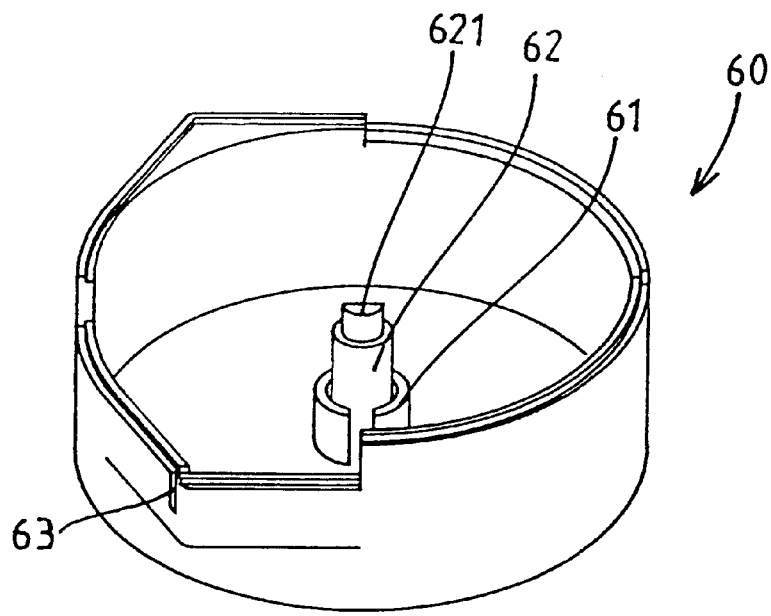
Figure 9A:
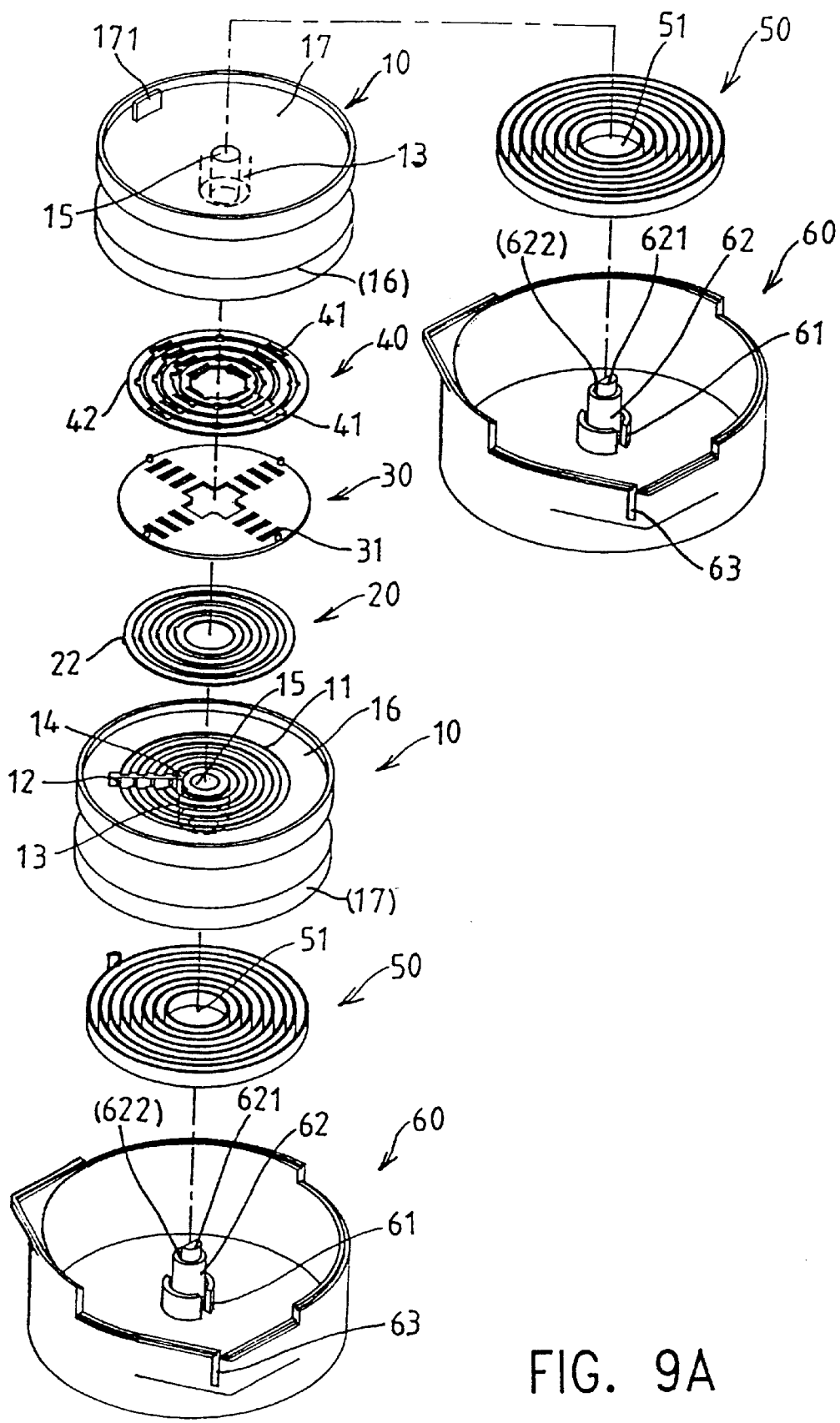
FIG. 9A is an exploded view of the reversible cable reel according to the first embodiment of the present invention.
Figure 9B:
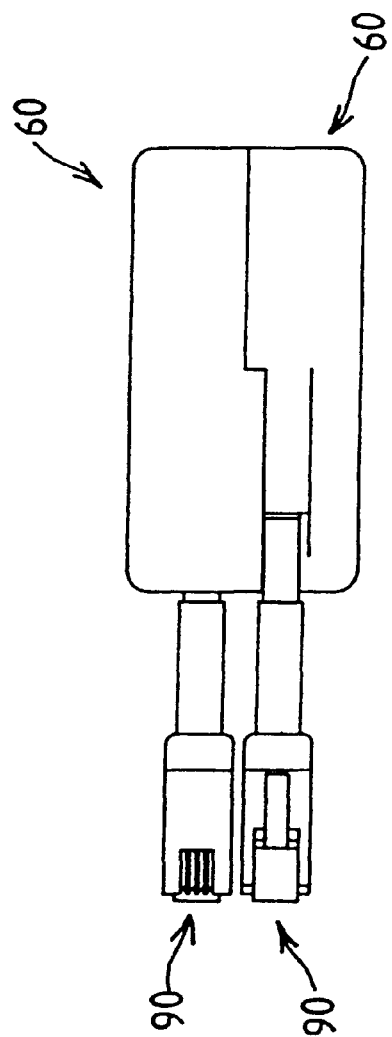
FIG. 9B is an assembly view of the reversible cable reel according to the first embodiment of the present invention.
Figure 9C:
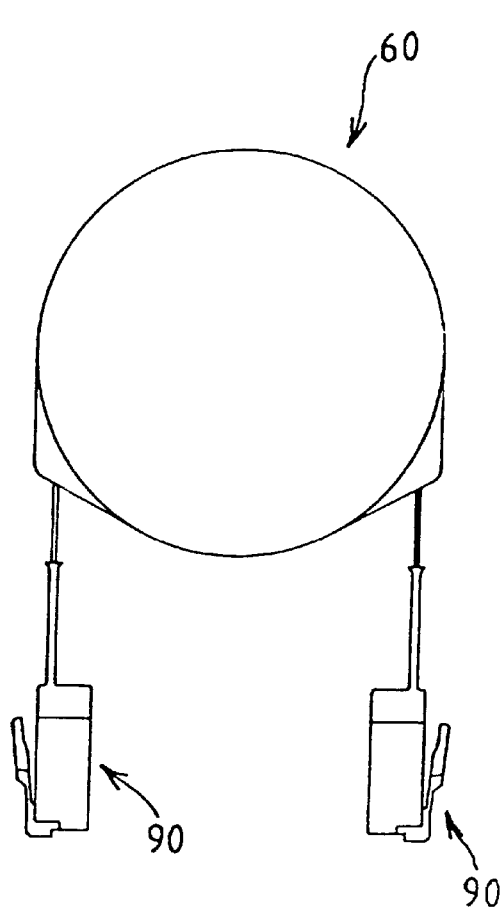
FIG. 9C is a top view of the reversible cable reel according to the first embodiment of the present invention.
Figure 9D:
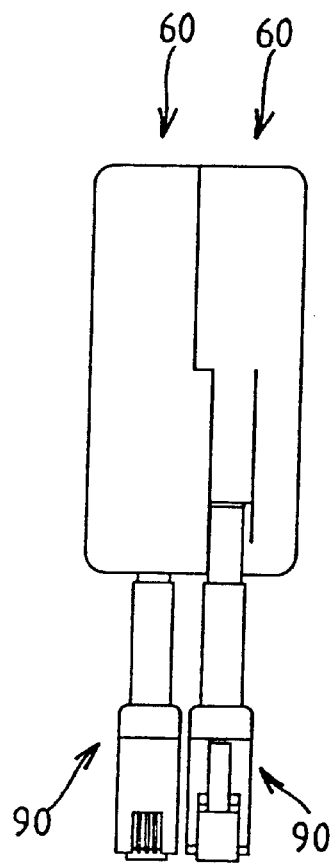
FIG. 9D is a side view of the reversible cable reel according to the first embodiment of the present invention.
Figure 9E:
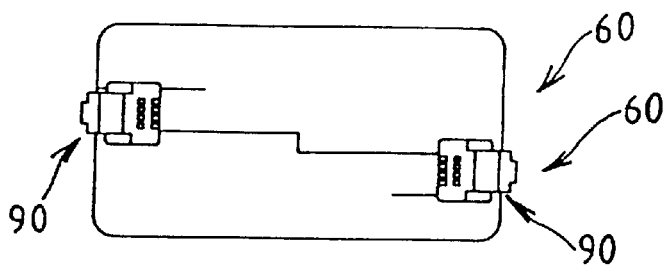
FIG. 9E is a front view of the reversible cable reel according to the first embodiment of the present invention.

Referring to FIGS. 5A and 5B and FIG. 9A again, the cover shells 60 are symmetrical. Each cover shell 60 comprises a center shaft 62 for insertion into the center axle hole 15 on one cable wheel 10, a coupling device for example a plug 621 or plug hole 622 provided at the end of the center shaft 62 by which the center shafts 62 of the two cover shells 60 are connected together, a split stub tube 61 spaced around the center shaft 62, and a side notch 63.

Referring to FIGS. 9A again, the spiral springs 50 are respectively mounted in the cover shells 60 within the recessed bottom chambers 17 of the cable wheels 10. Each spiral spring 50 has an inner end 51 fastened to the split stub tube 61 on one cover shell 60, and outer end connected to the locating plate 171 in one cable wheel 10.

Referring to FIGS. from 9B to 9D, the cables 90 are respectively wound round the cable wheels 10. Each cable 90 has one end inserted through the cable outlet 14 and secured to the through holes 12 on one cable wheel 10 for connection with the first terminal unit 20 or the second terminal unit 40, and an opposite end extended out of the side notch 63 on one cover shell 60 and terminating in for example a module plug.

Figure 8:
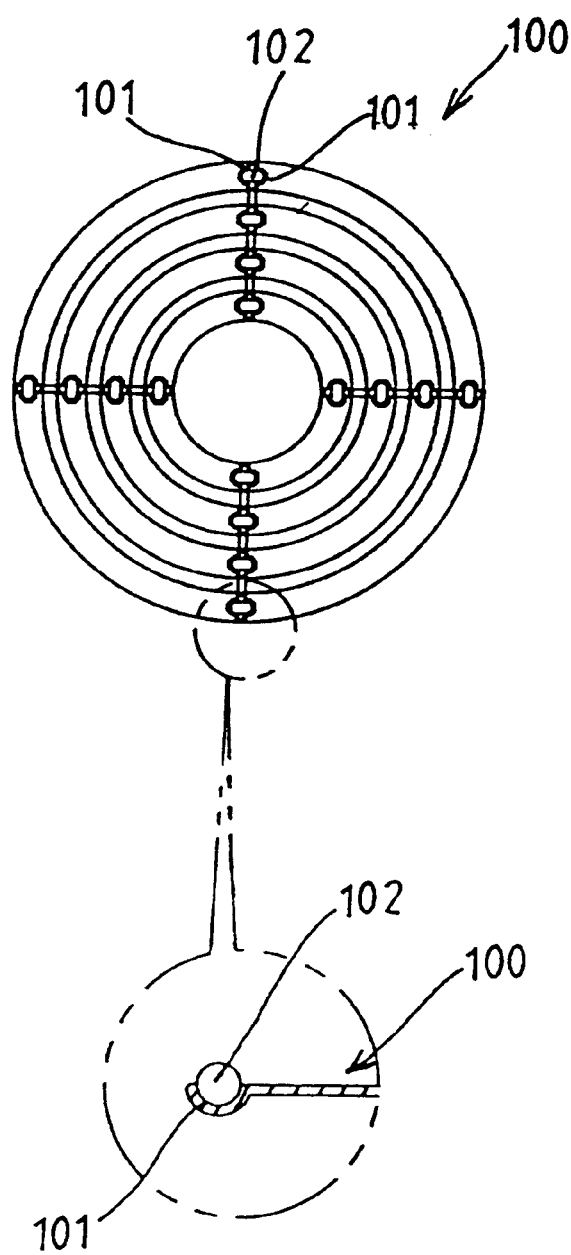
FIG. 8 shows an alternate form of the second terminal unit according to the present invention.

FIG. 8 shows a terminal unit 100 adapted to replace the aforesaid second terminal unit 40. Each ring of the terminal unit 100 has a plurality of ball socket means 101 holding a respective ball 102 for contact with the first terminal unit 20.

Figure 10A:
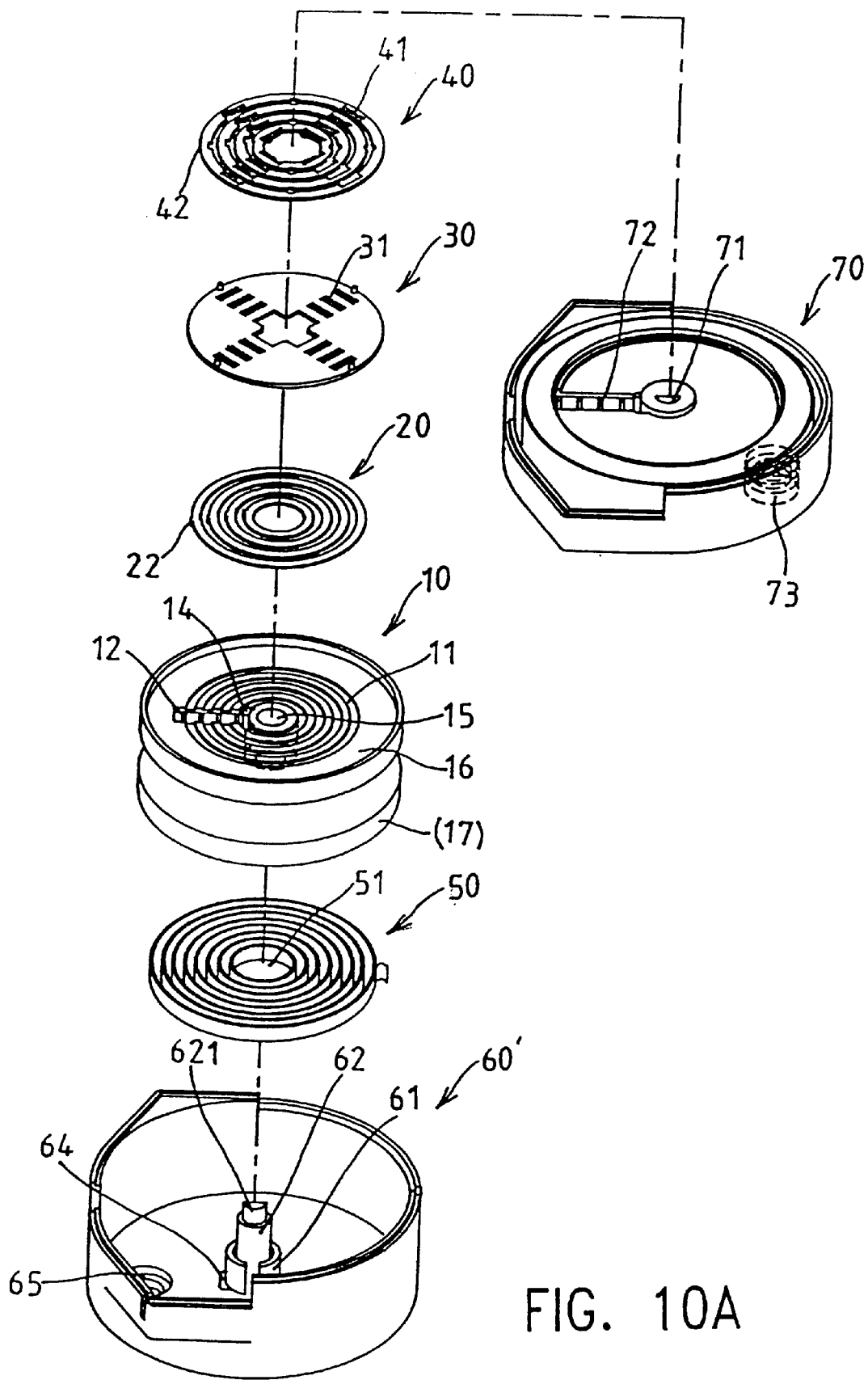
FIG. 10A is an exploded view of a reversible cable reel according to a second embodiment of the present invention.

FIG. 10A shows a reversible cable reel according to a second embodiment of the present invention, which is comprised of a first cover shell 60', a second cover shell 70, one spiral spring 50, one cable wheel 10, a first terminal unit 20, a second terminal unit 40, and a cover board 30. The second cover shell 70 comprises a plug hole 71 on the inside at the center which receives the plug rod 621 on the first cover shell 60', and a plurality of radially aligned holes 72 which receive the forked contact tips 42 of the second terminal unit 40. The first cover shell 60' has a cable hole 64 through which the respective cable passes.

Figure 10B:
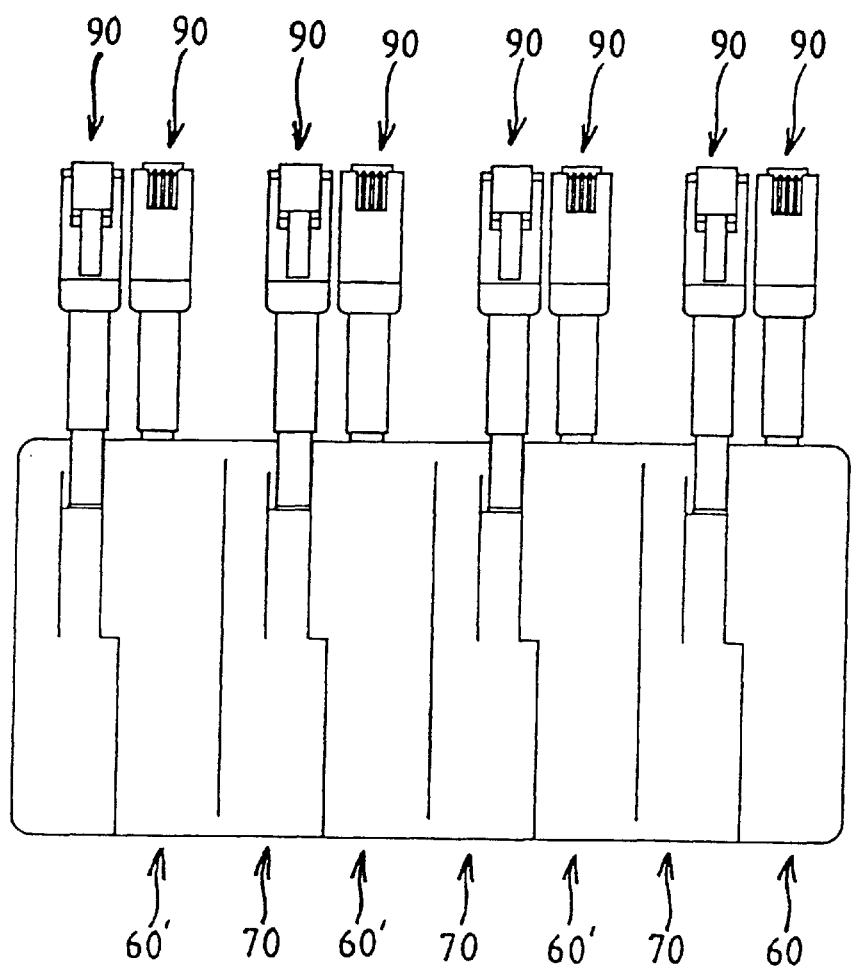
FIG. 10B shows a plurality of reversible cable reels connected in a stack according to the present invention.
Figure 10C:
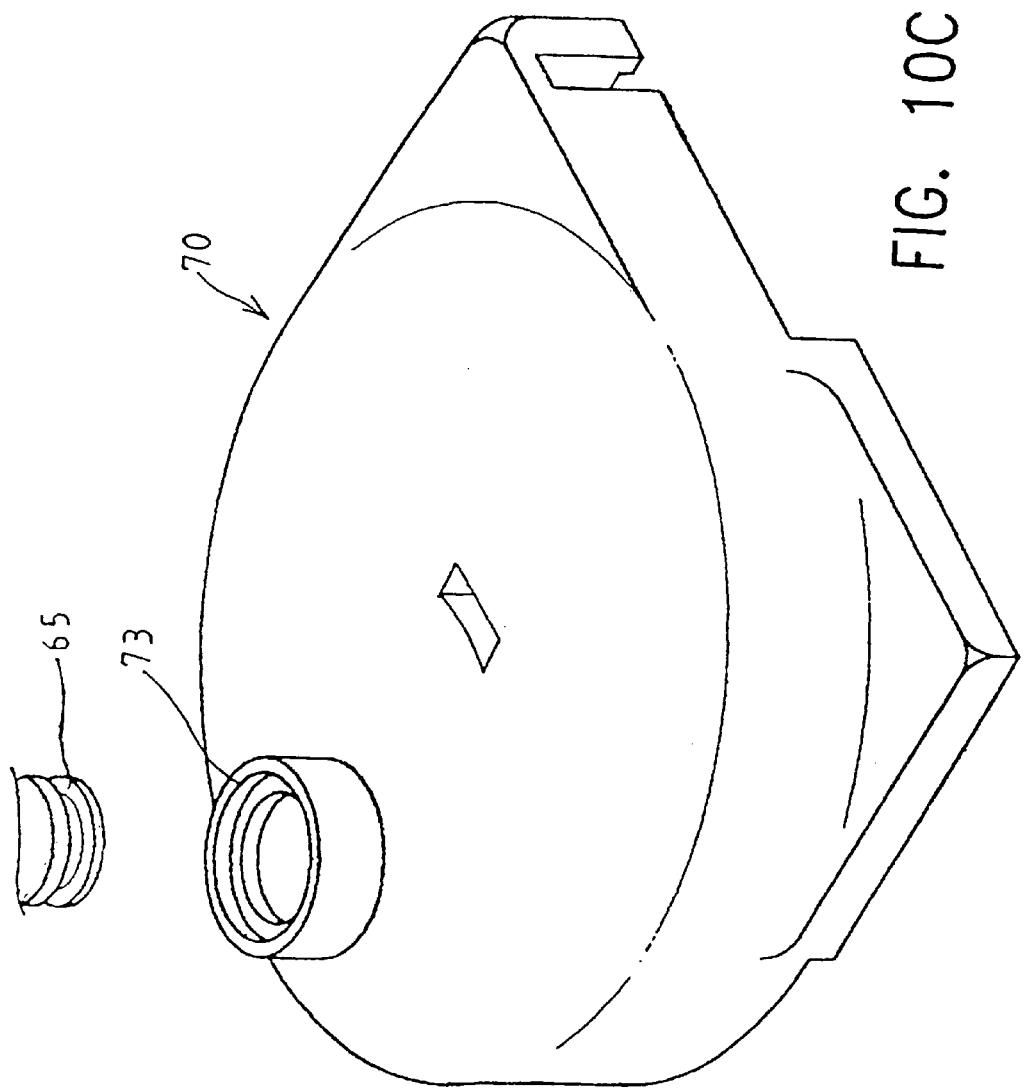
FIG. 10C is an enlarged view of the second cover shell according to the second embodiment of the present invention.
Figure 11A:
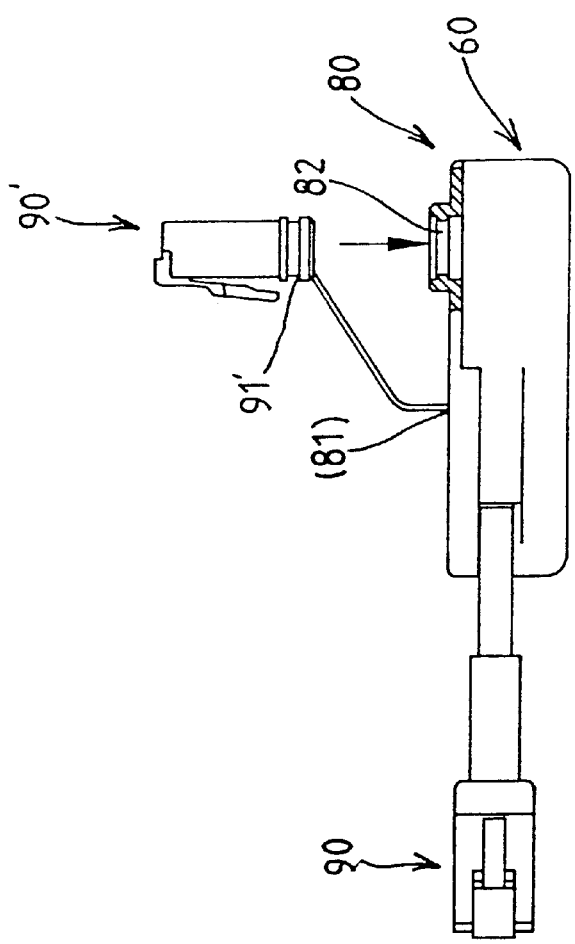
FIG. 11A is a sectional view of the second cover shell according to the second embodiment of the present invention.
Figures 11B, 11C:
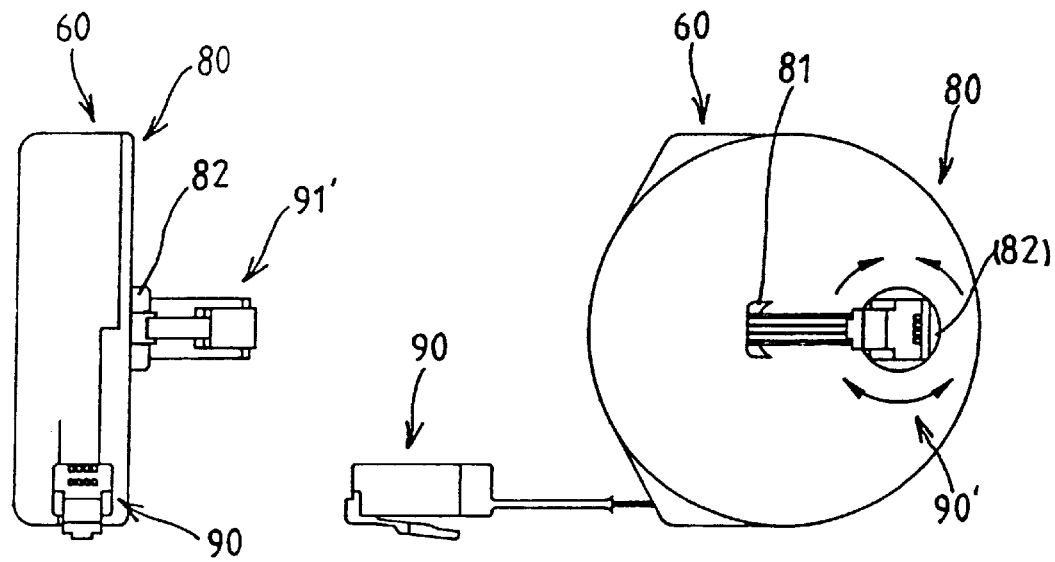
FIG. 11B shows the module plug fastened to the second cover shell according to the second embodiment of the present invention.
FIG. 11C is a side view of FIG. 11B.
Figure 11D:
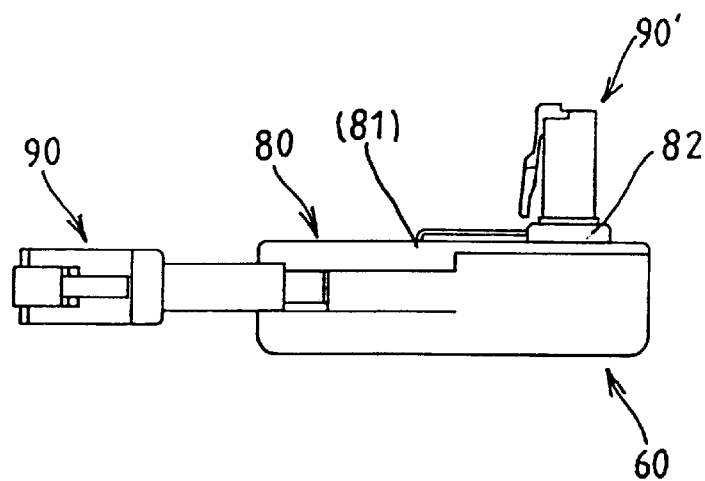
FIG. 11D is a front view of FIG. 11B.
Figure 11E:
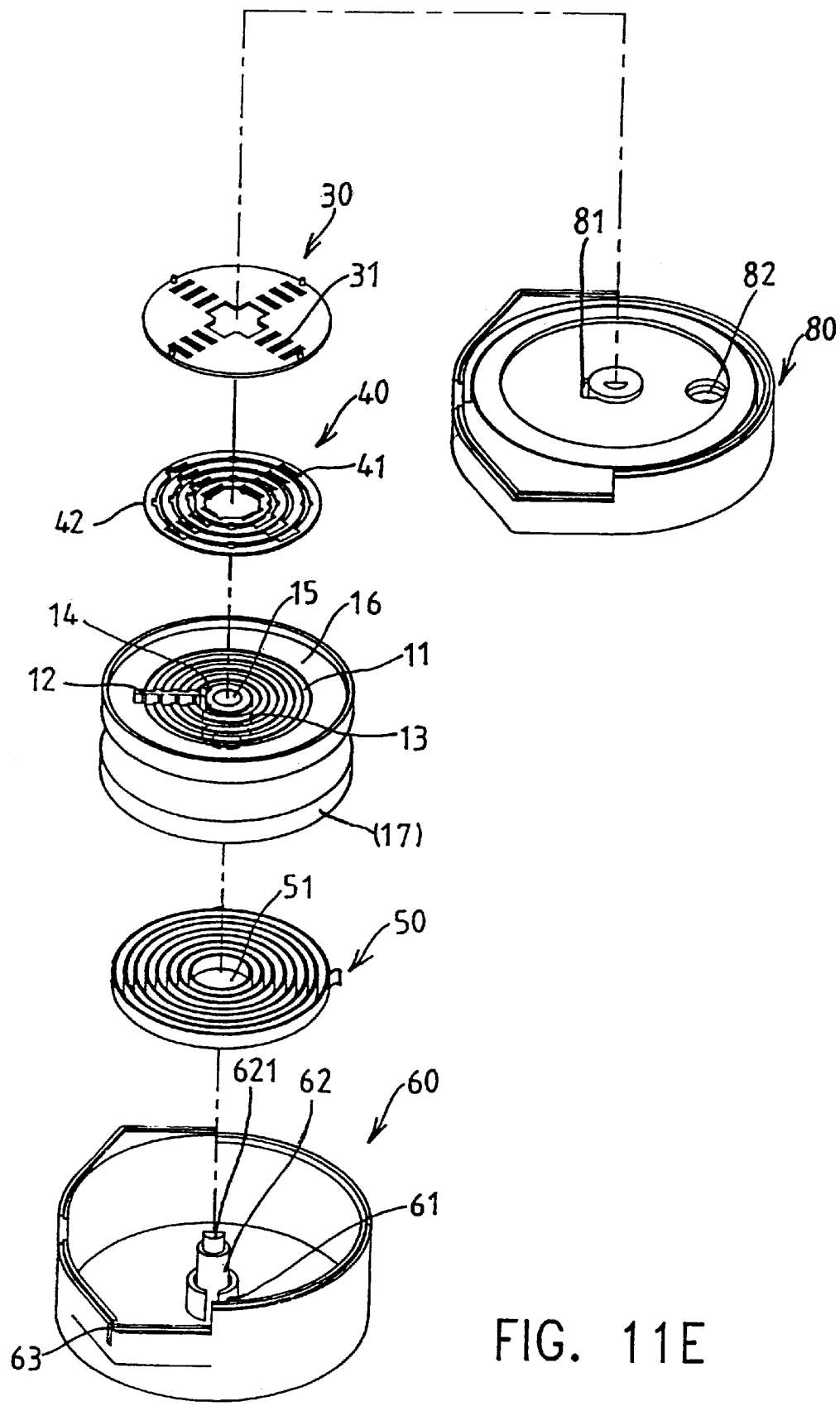
FIG. 11E is an exploded view of a reversible cable reel according to a third embodiment of the present invention.

Referring to FIGS. 10B and 10C and FIG. 10A again, the first cover shell 60' has a plurality of coupling holes 65. The second cover shell 70 has a plurality of coupling rods 73 disposed on the outside for coupling to the respective coupling holes 65 on the first cover shell 60'. By fastening the coupling rods 73 on the second cover shell 70 of one reversible cable reel to the coupling holes 65 on the first cover shell 60' of another reversible cable reel, a plurality of reversible cable reels are connected in a stack.

FIGS. from 11A to 11E show a reversible cable reel according to a third embodiment of the present invention.

According to this embodiment, one cover shell 80 has a cable hole 81 through which the respective cable 90' extends to the outside, and a locating hole 82 for holding the module plug 91' of the cable 90'.

It is to be understood that the drawings are designed for purposes of illustration only, and are not intended as a definition of the limits and scope of the invention disclosed.

What the invention claimed is:

1. A reversible cable reel comprising:

a first cover shell and a second cover shell connected together, said first cover shell comprising a cavity, a center shaft extending from a surface inside a central portion of said cavity, a plug rod axially extending from the center shaft, and a side notch formed through a wall of said first cover shell, said second cover shell comprising a cavity, a center shaft extending from a surface inside a central portion of said cavity of said second cover shell and having a plug hole formed therein, and a side notch formed through a wall of said second cover shell, said plug hole of said center shaft of said second cover shell receives said plug rod of said first cover shell;

a first cable wheel mounted around the center shaft of said first cover shell, said first cable wheel comprising a recessed top chamber, a recessed bottom chamber, a center shaft connected between the recessed top chamber and recessed bottom chamber thereof, a center axle hole piercing axially through the center shaft thereof through which the center shaft of said first cover shell passes;

a second cable wheel mounted around the center shaft of said second cover shell, said second cable wheel comprising a recessed top chamber, a recessed bottom chamber, a center shaft connected between the recessed top chamber and recessed bottom chamber thereof, a center axle hole piercing axially through the center shaft thereof through which the center shaft of said second cover shell passes;

a first spiral spring mounted around the center shaft of said first cover shell within the recessed bottom chamber of said first cable wheel, said first spiral spring having an inner end connected to said first cover shell and a second end connected to said first cable wheel;

a second spiral spring mounted around the center shaft of said second cover shell within the recessed bottom chamber of said second cable wheel, said second spiral spring having an inner end connected to said second cover shell and a second end connected to said second cable wheel;

a first cable wound around the center shaft of said first cable wheel, said first cable having a first end fixedly fasten ed to said first cable wheel and a second end extending through the side notch of said first cover shell;

a second cable wound around the center shaft of said second cable wheel, said second cable having a first end fixedly fastened to said second cable wheel and a second end extending through the side notch of said second cover shell;

a first terminal unit mounted within the recessed top chamber of said first cable wheel, said first terminal unit having at least one forked terminal tip forced into contact with a respective conductor in said first cable;

a second terminal unit mounted within the recessed top chamber of said second cable wheel, said second terminal unit having at least one forked terminal tip forced into contact with a respective conductor in said second cable, and a plurality of contacts disposed in contact with said first terminal unit; and a cover plate retained between said first terminal unit and said second terminal unit, said cover plate having a plurality of through holes through which the contacts of said second terminal unit respectively pass.

2. The reversible cable reel of claim 1, wherein said first cable wheel comprises a plurality of annular grooves concentrically disposed inside the recessed top chamber thereof; said second cable wheel comprises a plurality of annular grooves concentrically disposed inside the recessed top chamber thereof; said first terminal unit comprises a plurality of metal contact rings respectively mounted in the annular grooves inside the recessed top chamber of said first cable wheel, each metal contact ring of said first terminal unit having a forked terminal tip forced into contact with one conductor in said first cable; said second terminal unit comprises a plurality of metal contact rings respectively mounted in the annular grooves inside the recessed top chamber of said second cable wheel, each metal contact ring of said second terminal unit having a forked terminal tip forced into contact with one conductor in said second cable and a contact spring strip inserted through one through hole on said cover plate and disposed in contact with one metal contact ring of said first terminal unit.

3. The reversible cable reel of claim 1, wherein said first cable wheel comprises a plurality of annular grooves concentrically disposed inside the recessed top chamber thereof; said second cable wheel comprises a plurality of annular grooves concentrically disposed inside the recessed top chamber thereof; said first terminal unit comprises a plurality of metal contact rings respectively mounted in the annular grooves inside the recessed top chamber of said first cable wheel, each metal contact ring of said first terminal unit having a forked terminal tip forced into contact with one conductor in said first cable; said second terminal unit comprises a plurality of metal contact rings respectively mounted in the annular grooves inside the recessed top chamber of said second cable wheel, each metal contact ring of said second terminal unit having a forked terminal tip at one side forced into contact with one conductor in said second cable, a ball socket means at an opposite side, and a metal contact ball revolvably supported in said ball socket means and partially projecting into one through hole on said cover plate into contact with one metal contact ring of said first terminal unit.

4. The reversible cable reel of claim 1, wherein said first cover shell has a male coupling on an outside surface thereof and said second cover shell has a female coupling on an outside surface thereof, such that a plurality of reversible cable reels can be connected in a stack by fastening the male coupling of the first cover shell of one reversible cable reel to the female coupling of the second cover shell of another reversible cable reel.

5. The reversible cable reel of claim 1, wherein the second ends of said first cable and said second cable have a respective module plug mounted thereon.

6. The reversible cable reel of claim 5, wherein said first cover shell and second said cover shell each have a respective mounting hole formed therein and adapted to receive the module plug of the respective cable.

* * * * *